(12) United States Patent
Johnson

(10) Patent No.: US 11,475,433 B2
(45) Date of Patent: Oct. 18, 2022

(54) AD-HOC LIGHTWEIGHT MPOS REMOTE CONTROL

(71) Applicant: ROKU, INC., Los Gatos, CA (US)

(72) Inventor: Neil Edward Johnson, Cambridge (GB)

(73) Assignee: ROKU, INC., San Jose, CA (US)

( * ) Notice: Subject to any disclaimer, the term of this patent is extended or adjusted under 35 U.S.C. 154(b) by 125 days.

(21) Appl. No.: 16/669,664

(22) Filed: Oct. 31, 2019

(65) Prior Publication Data

US 2020/0160317 A1   May 21, 2020

Related U.S. Application Data

(60) Provisional application No. 62/769,981, filed on Nov. 20, 2018.

(51) Int. Cl.
| | |
|---|---|
| G06Q 20/32 | (2012.01) |
| G06Q 20/20 | (2012.01) |
| G06Q 20/38 | (2012.01) |
| G06Q 20/22 | (2012.01) |
| G06Q 20/12 | (2012.01) |
| G06Q 30/06 | (2012.01) |
| G06K 7/10 | (2006.01) |

(Continued)

(52) U.S. Cl.
CPC ..... *G06Q 20/3278* (2013.01); *G06K 7/10297* (2013.01); *G06Q 20/0855* (2013.01); *G06Q 20/123* (2013.01); *G06Q 20/204* (2013.01); *G06Q 20/227* (2013.01); *G06Q 20/3224* (2013.01); *G06Q 20/382* (2013.01); *G06Q 30/0643* (2013.01); *H04W 12/03* (2021.01); *G06Q 2220/00* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2006/0055554 A1* | 3/2006 | Hayes | ............ H04N 21/42204 340/4.3 |
| 2013/0167167 A1 | 6/2013 | Steyer et al. | |

(Continued)

FOREIGN PATENT DOCUMENTS

| | | |
|---|---|---|
| KR | 10-1393367 B1 | 5/2014 |
| KR | 2018-0053783 A | 4/2018 |

OTHER PUBLICATIONS

International Search Report and Written Opinion of the International Searching Authority directed to related International Patent Application No. PCT/US2019/062133, dated Apr. 2, 2020; 11 pages.

*Primary Examiner* — Paul Danneman
(74) *Attorney, Agent, or Firm* — Sterne, Kessler, Goldstein & Fox P.L.L.C.

(57) ABSTRACT

Disclosed herein are a device, method, and system for dynamically activating a lightweight mobile point-of-sale (mPOS) within a remote control creating an ad-hoc payment system within a media system. When the lightweight mPOS is activated, remote control may operate as an ad-hoc lightweight mPOS that is capable of receiving contactless payment information for purchase of content provided by a media device. The lightweight mPOS may be controlled by the media device in response to a request to purchase the content.

20 Claims, 5 Drawing Sheets

(51) Int. Cl.
*G06Q 20/08* (2012.01)
*H04W 12/03* (2021.01)
*H04W 84/18* (2009.01)

(56) References Cited

U.S. PATENT DOCUMENTS

| | | | |
|---|---|---|---|
| 2014/0006285 A1* | 1/2014 | Chi | G06Q 20/40 705/44 |
| 2014/0081837 A1 | 3/2014 | Rybarczyk et al. | |
| 2014/0259061 A1 | 9/2014 | Delpuch | |
| 2016/0328690 A1* | 11/2016 | Atwal | G06Q 20/382 |

* cited by examiner

AD-HOC LIGHTWEIGHT MPOS REMOTE CONTROL

RELATED APPLICATION

This application claims priority to U.S. Provisional Patent Application No. 62/769,981, filed Nov. 20, 2018, titled "Ad-hoc Lightweight mPOS Remote Control," the contents of which are hereby incorporated herein by reference in its entirety.

BACKGROUND

Field

This disclosure is generally directed to a remote control with lightweight mobile point-of-sale (mPOS) functionality. More particularly, this disclosure relates to a remote control having lightweight mPOS device capability that may be activated as needed for providing contactless payments of media content through a media system.

Background

A user's home network may typically include a media system. The media system may generally enable a user or consumer to purchase, through the media system, content, such as, for example, music, movies, TV series, audio books, games, and/or the like. To simplify the purchase process, the media system may have access to a previously stored account that includes a user's purchase information, such as, for example, credit cards and financial account information. For example, in a home network, the media system may store the homeowner's payment information such as his credit card information.

However, the media system typically lacks a simplified mechanism for allowing different purchase information from other users to be used for making purchases through the media system. For example, a guest of the homeowner, such as a friend or a babysitter, would not be able to purchase content through the homeowner's media system using their own purchase information, and would instead be forced to use the stored payment information of the homeowner.

SUMMARY

Provided herein are system, apparatus, article of manufacture, method and/or computer program product embodiments, and/or combinations and sub-combinations thereof, for providing contactless payment functionality through an ad-hoc lightweight mPOS remote control for purchases in a media system.

An embodiment is directed to a method that includes steps for accepting contactless payments through a lightweight mPOS implemented within a Wi-Fi device. In an embodiment, the method may include operations of displaying, on a media system that may include a display device and a media device in some combination, media content. The method may further include receiving a selection of the media content and determining not to use stored payment information for purchasing the media content. The method may further include initiating activation of a lightweight mPOS including a contactless payment reader and receiving, at the activated contactless payment reader, encrypted payment information. The method may also include transmitting, from the lightweight mPOS to the media system, the encrypted payment information.

Another embodiment is directed to a remote control device that includes a processor and a lightweight mobile point-of-sale (mPOS) terminal having a contactless payment reader. The lightweight mPOS terminal may be configured to receive, through the contactless payment reader, encrypted payment information. The processor may be configured to transmit, to a media system, a command for purchasing media content associated with the media system and responsive to transmitting the command and receive, from the media system, a signal to activate the lightweight mPOS including the contactless payment reader. Responsive to receiving the signal, the processor may be further configured to activate the lightweight mPOS, and responsive to activating the lightweight mPOS, transmit, to the media system, the encrypted payment information.

Another embodiment is directed to a media device including a processor configured to perform certain operations including receiving, from a remote control device, a selection of media content and determining not to use stored payment information for purchase of the media content. The processor may further establish a payment session between the media device and the remote control. The processor may be further configured to transmit, through the payment session, a signal configured to activate a lightweight mobile point-of-sale (mPOS) system in the remote control device, receive, from the lightweight mPOS, encrypted payment information, and based on the encrypted payment information, authorize purchase of the media content.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Conventional media systems typically include stored payment information to streamline the purchase process of content by different users through a media system. In a home environment, the media system usually will store payment information associated with a single user, such as the homeowner. The stored payment information simplifies the purchase process, but limits the payment of content that is desired to be purchased to only the stored payment information. In other words, a conventional media system does not provide a simplified manner, such as contactless payment methods, for the homeowner or other users to provide alternative payment information to make purchases through the media system. The present disclosure describes an improved remote control that may be activated in an on-demand manner to create an ad-hoc lightweight mPOS capable of receiving encrypted payment information from different sources and different users. Once the purchase is approved, the lightweight mPOS may be deactivated returning the remote control to its normal state and thereby conserving battery usage.

Figure 1:
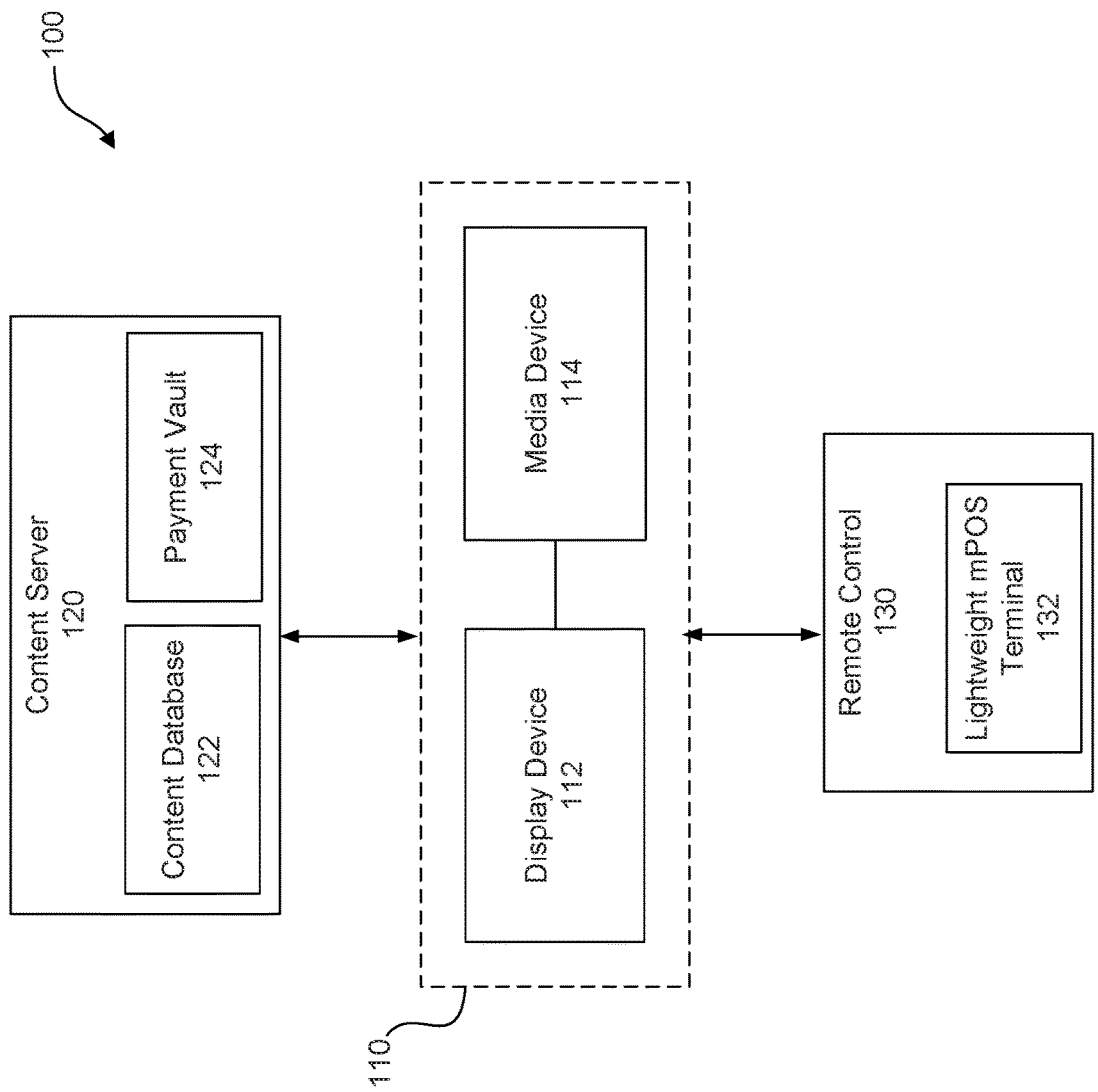
FIG. 1 illustrates a block diagram of a multimedia environment, according to some embodiments.

FIG. 1 illustrates a block diagram of a multimedia environment 100, according to some embodiments. In a non-limiting example, multimedia environment 100 is directed to playing interactive and non-interactive content, such as video content (having associated audio), audio content, computer games, and image content, to name just some examples, on a media system such as media systems 110.

Multimedia environment 100 may include one or more media systems such as media system 110. In an embodiment, media system 110 includes a display device 112 and media device 114. Media device 114 may be external to display device 112; connection between media device 114 and display device 112 may be a wired or wireless connection. For example, media device 114 may be connected to display device 112 through an HDMI cable. In another embodiment, media system 110 may be integrated into display device 112.

Media system 110 is merely a representative example of a possible configuration involving a media device and display device; a person of ordinary skill in the art would understand other configurations are within the scope of this disclosure. For example, although only a single device representing each of display device 112 and media device 114 is illustrated within media system 110, a person of ordinary skill in the art would understand that media system 110 may comprise any number of these devices. Similarly, a person of ordinary skill in the art would understand that media system 110 is not limited to the specific number of remote controls and may comprise more or less than the number shown in FIG. 1.

Display device 112 may be implemented as, for example, a monitor, television, computer, smart phone, tablet, and/or projector, to name just some examples. Display device 112 may support 4K or 4K HDR, for example, or any other resolution. Display device 112 may include any number and type of ports for receiving video content. Depending on the type and/or age of display device 112, these ports may be implemented as different HDMI ports such as an HDMI 1.4 port, an HDMI 2.0 port, HDMI Audio Return Channel (ARC) port, an HDML Mobile High-Definition Link port, or an HDML Digital Video In (DVI) port, to name just a few examples.

Media device 114 may be implemented as, for example, a streaming media device, DVD device, audio/video playback device, cable box, a video game console, a Blu-ray disc player, a speaker, and/or digital video recording device, to name just some examples. Media device 114 may include any number and type of ports for inputting and outputting video content. Depending on the type and/or age of media device 114, these ports may also be implemented as different HDMI ports as described above with regard to display device 112. In some embodiments, media device 114 can be a part of, integrated with, operatively coupled to, and/or connected to display device 112.

Content server 120 may include content database 122 and payment vault 124. In an embodiment, content server 120 may be associated with a media content provider that may provide any combination of media content such as music, videos, TV programs, movies, multimedia, images, still pictures, text, graphics, gaming applications, advertising, software, and/or any other content or data objects in electronic form. In an embodiment, media content refers to content that may be retrieved (e.g., downloaded or streamed) via a network and presented by media device 114. Content server 120 may also be capable of authorizing financial transactions. In an embodiment, content server 120 may forward financial transactions to another server that provides authorization to content server 120. In another embodiment, content server 120 may authorize the financial transactions internally.

In an embodiment, payment vault 124 includes an advertising server that may be associated with content providers that deliver content to a physical location such as a home of the user of media system 110. Payment vault 124 may include functionality that enables purchase of content being advertised via media system 110 and may further include functionality to carry out the purchase including initiating the delivery of selected content purchased via media system 110. Examples of content include goods such as pizza or other items that may be purchased and delivered to a physical location.

After authorization of the financial transaction, content server 120 may then provide requested media content to media system 110. In an embodiment, content server 120 retrieves media content from content database 122; in another embodiment, content server 120 retrieves the media content from another server from another media content provider.

In an embodiment, interaction with display device 112 and/or media device 114 may be via remote control 130. Remote control 130 may be a standard remote control for controlling media device 114 and/or display device 112. A standard remote control, for example, may lack certain components such as a display for displaying information to a user of media system 110 and a touchscreen for receiving inputs from the user. A standard remote control may also include physical buttons for receiving inputs from a user; activation of the physical buttons may result in transmission of commands for controlling operations on media device 114 and/or display device 112.

As will be discussed in further detail with respect to FIG. 2, remote control 130 may include lightweight mPOS terminal 132 that may be activated or deactivated as needed for making purchases from media system 110. When lightweight mPOS terminal 132 is activated, remote control 130 becomes a lightweight mPOS that is capable of receiving encrypted payment information and transmitting the encrypted payment information to a payment device such as media system 110.

In an embodiment, lightweight mPOS terminal 132 may include components for wirelessly receiving secure payment information from an external source equipped with a component for enabling transmission of secure payment information through near-field communication devices such as a mobile phone or a NFC-enabled credit card. Lightweight mPOS terminal 132 allows for the receipt of alternative payment means of purchases through media system 110 without having to rely on payment information stored on (or otherwise accessible by) media system 110 prior to receiving a selection of content for purchase. For example, the stored payment information may be associated with a primary user of media system 110 such as a homeowner; the alternative payment method may be the mobile phone or NFC-enabled credit card that is brought within proximity of lightweight mPOS terminal 132 by a visitor or guest of media system (i.e., a user that does not have stored payment information accessible by media system 110).

In an embodiment, the term "lightweight" describes a property of a component having a reduced amount of elements. Lightweight mPOS terminal 132 may lack certain features so that it can be implemented within a device having reduced capabilities such as remote control 130. For example, remote control 130 may lack a display for displaying any information to a user; remote control 130 may also lack a secure element for executing a financial transaction based on the secure payment information and for storing a record of financial transactions; remote control 130 may also be limited to contactless payment methods and lack other mechanisms, such as a magnetic stripe reader or contact reader, for receiving the payment information. Remote control 130 may also be limited with regard to the number or types of inputs that are operable by a user. For example, remote control may be limited to physical buttons and/or lack a touchscreen for receiving touch inputs.

In other words, in an embodiment, remote control with a lightweight mPOS may act as an open channel for transferring encrypted data packets between a payment source that is enabled with contactless payment capability, such as a mobile phone or a credit card, without further processing the encrypted data packets or displaying any information or status related to the encrypted data packets.

In an embodiment, lightweight mPOS terminal 132 may include software for controlling operations of lightweight mPOS terminal 132 for transmitting encrypted payment information with media device 114 and a contactless payment reader for wirelessly receiving encrypted payment information.

Figure 2:
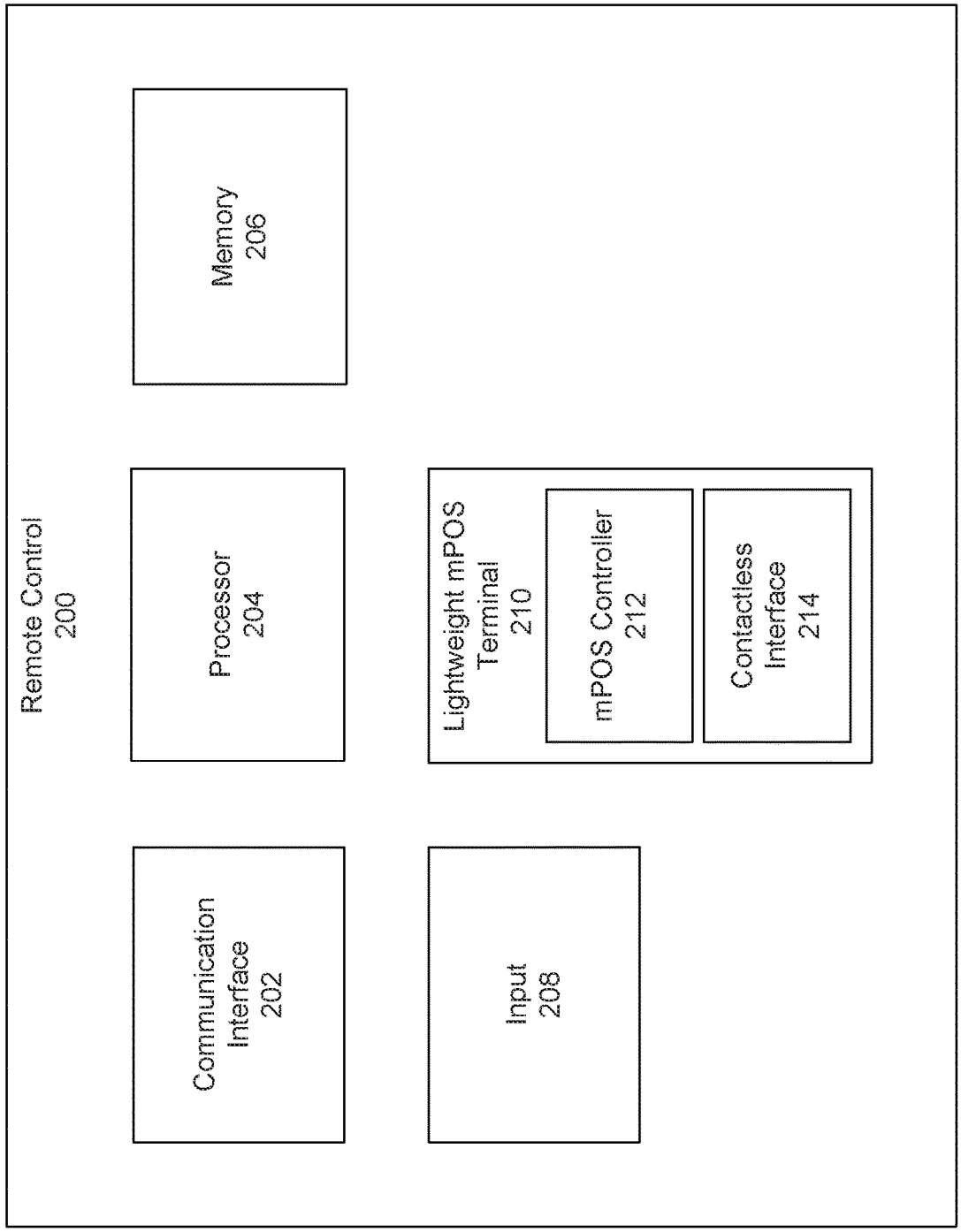
FIG. 2 illustrates a block diagram of an ad-hoc lightweight mPOS remote control, according to some embodiments.

FIG. 2 illustrates a block diagram of an ad-hoc lightweight mPOS remote control, according to some embodiments. In an embodiment, remote control 200 may include communication interface 202, processor 204, memory 206, input 208, and lightweight mPOS terminal 210. In an embodiment, lightweight mPOS terminal 210 may include mPOS controller 212 and contactless interface 214. The following discussion of remote control 200 will refer to devices of FIG. 1 for non-limiting, illustrative purposes. In an embodiment, remote control 200 may be representative of remote control 130 in FIG. 1.

Remote control 200 transmits commands and/or other signals for controlling or otherwise interacting with a controllable device, such as display device 112 and media device 114, in media system 110.

Communication interface 202 enables remote control 200 to communicate and interact with any combination of remote devices, remote networks, remote entities, etc. such as media system 110. For example, communication interface 202 can allow remote control 200 to communicate with media system 110 using a wireless connection including Wi-Fi as one example. Communication interface 202 may be used to transmit and receive commands and data from remote devices such as media system 110. In an embodiment, a connection such as a Wi-Fi connection may be established between remote control 200 and media system 110. Within the connection, communication interface 202 may allow remote control 200 to establish a payment session between remote control 200 and media system 110 to allow for the transmission of encrypted payment information from remote control 200 and for the receipt, from media system 110 of data and/or control messages associated with the encrypted payment information.

In some embodiments, processor 204 controls operations of remote control 200. For example, processor 204 may control operations of components including communication interface 202, memory 206, input 208, and lightweight mPOS terminal 210, within remote control 200. For example, processor 204 may activate and deactivate lightweight mPOS terminal 210. In an embodiment, processor 204 may perform the activation and deactivation based on a signal or command received through communication interface 202 from a remote device, such as display device 112 and media device 114.

In some embodiments, memory 206 may store code or control logic that, when executed, causes processor 204 to perform the operations described above.

In some embodiments, input 208 may receive inputs from a user operating remote control 200. In an embodiment, input 208 may be implemented as one or more physical buttons that, when manipulated by a user, cause processor 204 to transmit signals and/or commands from remote control 200 to a remote device such as media system 110. As a lightweight mPOS, remote control 200 may lack other inputs such as a touchscreen. For example, in an embodiment, input 208 refers only to physical buttons on remote control 200.

In some embodiments, lightweight mPOS terminal 210 may, when activated, allow remote control 200 to function as a lightweight mPOS. In an embodiment, mPOS controller 212 may be code or control logic that, when executed by processor 204, provides functions for receiving encrypted payment information from a remote payment device such as a mobile phone or a credit card, establishing a payment session between remote control 200 and media system 110, and transmitting the encrypted payment information using the payment session.

In an embodiment, the remote payment device is an NFC-enabled device that communicates the payment information in accordance with NFC protocols. For example, a mobile phone or a credit card may be brought within proximity of lightweight mPOS terminal 210 which allows for the transmission of encrypted payment information from the mobile phone or credit card to mPOS controller 212 in lightweight mPOS terminal 210. The mPOS controller 212 may then forward, without further processing or storing, the encrypted payment information to media system 110 through communication interface 202. The mobile phone or credit represent an alternative payment method from stored payment information that is accessible to media system 110 prior to receiving the selection of content for purchase.

Activation (and deactivation) of lightweight mPOS terminal 210 may include activation (and deactivation) of contactless interface 214. In an embodiment, contactless interface 214 is an interface that enables encrypted information to be received and transmitted. Examples of contactless interface 214 include but are not limited to a near-field communication (NFC) reader.

Figure 3:
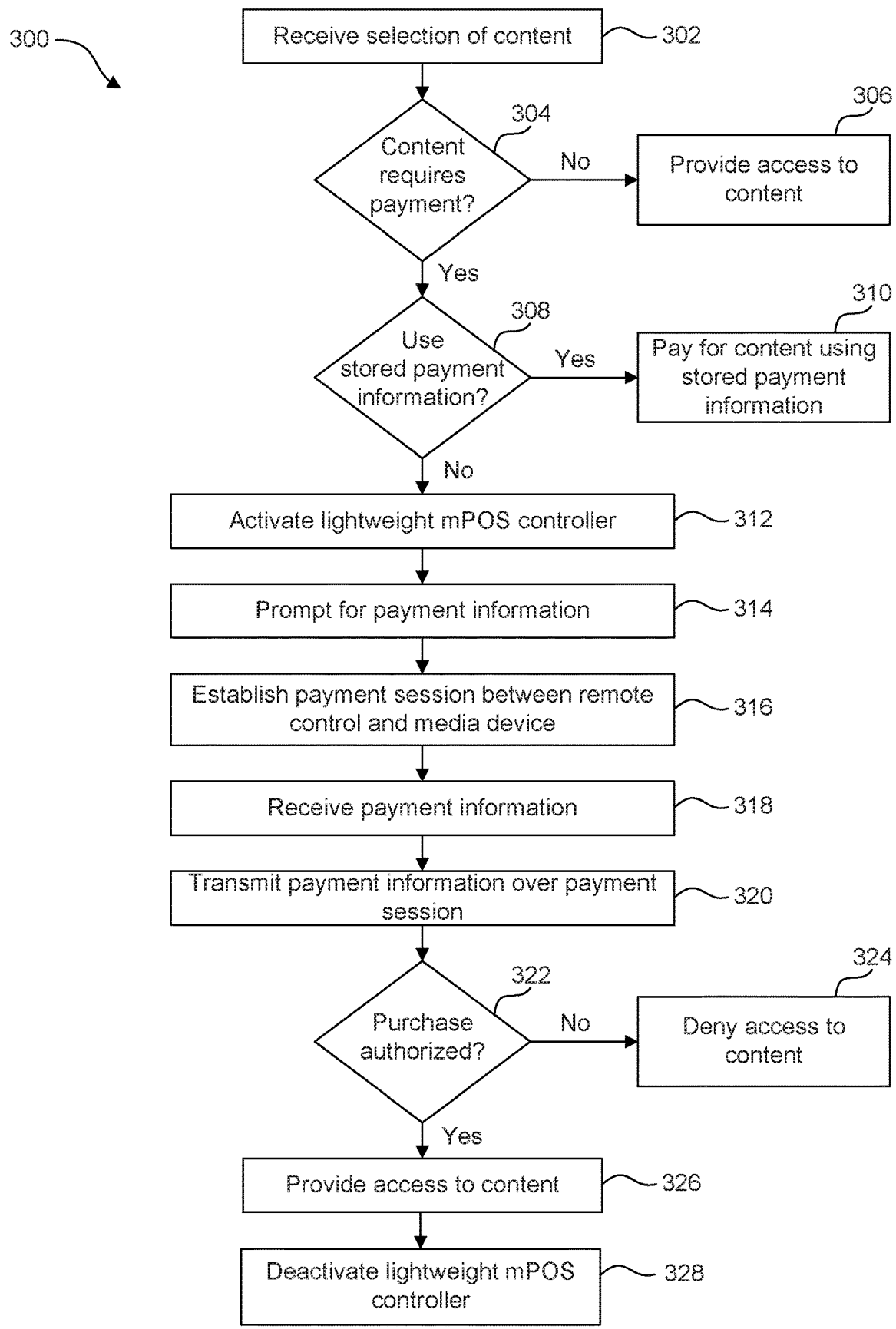
FIG. 3 is a flowchart for accepting contactless payments through an ad-hoc lightweight mPOS remote control, according to some embodiments.

FIG. 3 is a flowchart for accepting contactless payments through an ad-hoc lightweight mPOS remote control, according to some embodiments. As a non-limiting example with regard to FIGS. 1 and 2, the steps of method 300 shown in FIG. 3 may be performed by remote control 200, display device 112, and/or media device 114 for allowing contactless payments of content from content server 120. In such an embodiment, remote control 200 may execute code in memory 206 to perform certain steps of method 300 of FIG. 3. In an embodiment, display device 112 and/or media device 114 may also include code to perform certain steps of method 300. While method 300 of FIG. 3 will be discussed below as being performed by remote control 200 and media device 114, other devices including display device 112 may store the code and therefore may execute method 300 by directly executing the code. The following discussion of method 300 will refer to devices of FIGS. 1 and 2 as an exemplary non-limiting embodiment of method 300. For example, the following discussion describes implementation by media device 114 and remote control 200 but may be performed solely by media device 114.

It is to be appreciated that not all steps may be needed to perform the disclosure provided herein. Further, some of the steps may be performed simultaneously or in a different order than shown in FIG. 3, as will be understood by a person of ordinary skill in the art.

In 302, a selection of media content is received. In an embodiment, the selection may be received at remote control 200, such as through manipulation of input 208. Manipulation of input 208 may be in response to the display of the media content (e.g., on display device 112) by media device 114. For example, media device 114 may display an interface that depicts media content that may be selected by a user. Manipulation of input 208 may allow selection of media content.

In an embodiment, the selection may be received, in the form of a command or signal from remote control 200, at media device 114. Remote control 200 may transmit command or signal in response to manipulation of input 208; for example, pressing a physical button on remote control 200 may result in causing processor 204 to transmit a command or signal to media device 114 that results in selection of media content currently being displayed by media device 114.

In 304, media device 114 may determine whether the selected media content requires payment. For example, media device 114 may determine whether the selected media content is currently owned by a user associated with media device 114. As another example, media device 114 may determine whether the selected media content needs to be purchased or rented prior to being provided for display on display device 112.

In an embodiment, content may be an advertisement for products or services provided by content server 120. For example, products may include media content that can be streamed via a network to media device 114 such as movies, music, and interactive content; services may include goods that require delivery to a physical location such as the home of the user such as pizza.

In 306, if the selected content does not require payment (e.g., the content was previously purchased or the content is free), then media device 114 may provide the requested media content to display device 112 for display.

In 308, if the selected content does require payment (e.g., the content needs to be rented or purchased prior to being provided), media device 114 may determine whether to use stored payment information. In an embodiment, the stored payment information is stored in media device 114. Media device 114, in response to receiving the selection of content, may determine that stored payment information is available. In an embodiment, responsive to determining that stored payment information is available, media device 114 may further display an interface on display device 112 requesting a payment choice from remote control 200 whether to use the stored payment information. A payment choice received from remote control 200 in response to the display of the interface may indicate using (or not using) the stored payment information in order to purchase the selected content. In an embodiment, the payment choice received from remote control 200 is a command or signal responsive to information displayed on the interface. The payment choice may indicate whether to use the stored payment information or an alternative payment method (e.g., NFC payment) through remote control 200.

In another embodiment, the stored payment information is stored in content server 120 which may provide authorization to media device 114 based on the stored payment information. Media device 114, in response to receiving the selection of content, may query content server 120 to determine whether stored payment information is available for use in providing the selected content. Content server 120 may store payment information for users associated with media device 114. In response to the query, content server 120 may then provide authorization if stored payment information is available. In an embodiment, media device 114 may then display the interface having prompts for requesting a payment choice from remote control 200 whether to use the stored payment information available from content server 120.

In 310, if media device 114 determines to use stored payment information to purchase the selected content, media device 114 may utilize the stored payment information to purchase the selected content. In an embodiment, this determination may be based on input (e.g., payment choice) received from remote control 200 responsive to prompts displayed on display device 112. For example, one prompt may be for whether to use stored payment information and another prompt may be for utilizing an alternative payment method provided through remote control 200. In 310, in an embodiment, media device 114 receives, responsive to displaying the prompt, a signal from remote control 200 indicating selection to use stored payment information. After payment, media device 114 may then retrieve or otherwise the selected content to display on display device 112.

In 312, if media device 114 determines to use the lightweight mPOS functionality in remote control 200 to purchase the selected content (e.g., through receiving a signal responsive to a prompt displayed on display device 112), media device 114 may transmit a signal to remote control 200 to activate lightweight mPOS terminal 210. In an embodiment, lightweight mPOS terminal 210 is, by default, deactivated in order to preserve battery life of remote control 200. Lightweight mPOS terminal 210 may then be activated on-demand to authorize purchases of selected content. Once activated, remote control 200 becomes an ad-hoc lightweight mPOS capable of receiving payment information for the purchase of selected content provided through media device 114. Activation of lightweight mPOS terminal 210 may result in activation of mPOS controller 212 and may also result in activation of contactless interface 214. When activated, lightweight mPOS terminal 210 enables remote control 200 to operate as a lightweight mPOS that is capable of receiving contactless payments in a secure manner.

In 314, media device 114 may provide a prompt that lightweight mPOS terminal 210 has been activated and is ready to receive payment information. In an embodiment, the prompt may be an interface displayed on display device 112 with information indicating that remote control 200 is ready to receive payment information. In an embodiment, the payment information will be received through contactless interface 214, which may be implemented as an NFC reader.

In 316, media device 114 may establish a payment session with remote control 200. In an embodiment, the payment session is established as a channel through an existing connection between media device 114 and remote control. For example, the existing connection may be a Wi-Fi connection and the channel may be a secure NFC channel that allows for transmission of encrypted payment information received at mPOS controller 212 through contactless interface 214.

In 318, remote control 200 may receive the payment information at contactless interface 214. In an embodiment, the payment information is encrypted consistent with NFC protocols prior to being received at contactless interface 214. The payment information may be received from a device external to remote control 200, such as a mobile phone or credit card, which is enabled with contactless payment functionality, such as an NFC transmitter.

In 320, remote control 200 may transmit the received payment information over the established payment session to media device 114. In an embodiment, the payment information is encrypted and mPOS controller 212 may transfer the received encrypted payment information to communication interface 202 through the established payment session to media device 114.

In 322, media device 114 may receive the payment information from remote control 200 through the established payment channel and determine whether the purchase of the selected content is authorized based on the payment information. In an embodiment, media device 114 may transmit the encrypted payment information to a server such as content server which may include a payment authorization function. Media device 114 may then receive either an authorization or denial of the purchase based on the received encrypted payment information. In another embodiment, media device 114 may include the payment authorization function and perform the authorization of the encrypted payment information. In an embodiment, determining whether the purchase is authorized further includes closing the payment session subsequent to the determination.

In 324, if media device 114 determines that the encrypted payment information is not authorized, media device 114 may deny access to the selected payment and prevents the purchase.

In 326, if media device 114 determines that the encrypted payment information is authorized, media device 114 may allow the purchase of the selected media content. Media device 114 may then provide access to the selected media content. In an embodiment, providing access to the media may include retrieving the selected media content from content server 120. In an embodiment, media device 114 may retrieve the selected media content locally from memory within media device 114.

In 328, media device 114 may deactivate lightweight mPOS terminal 210. In an embodiment, media device 114 transmits a signal to remote control 200 through communication interface 202 causing mPOS controller 212 to be deactivated. In an embodiment, contactless interface 214 is deactivated. The purpose of deactivating lightweight mPOS terminal 210 is to reduce power consumption and conserve battery usage for remote control 200. In an embodiment, deactivating lightweight mPOS terminal 210 may include closing the payment session between remote control 200 and media device 114.

Figure 4:
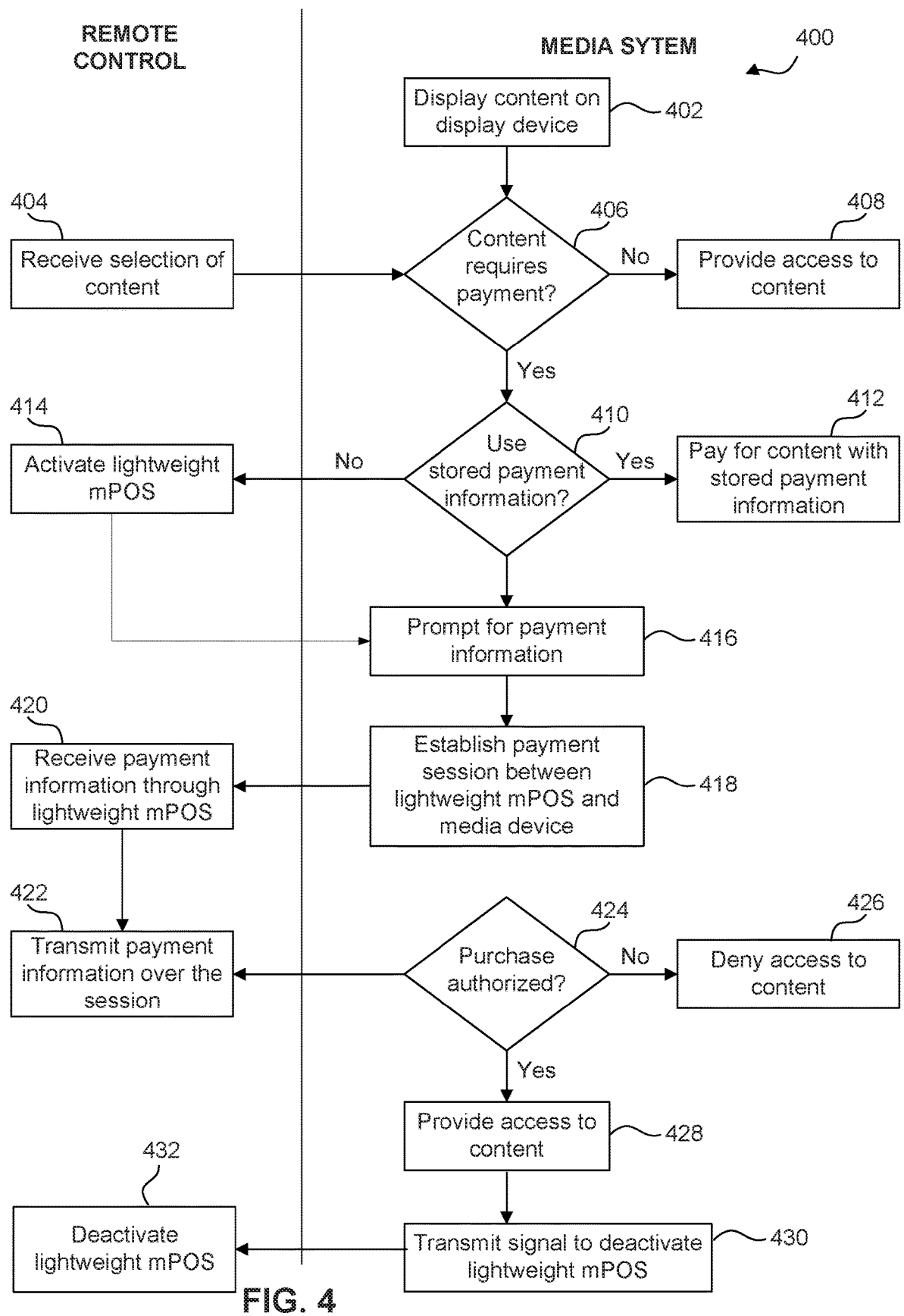
FIG. 4 is a flowchart for accepting contactless payments through an ad-hoc lightweight mPOS remote control, according to some embodiments.

FIG. 4 is a flowchart for accepting contactless payments through an ad-hoc lightweight mPOS remote control, according to some embodiments. As a non-limiting example with regard to FIGS. 1 and 2, the steps of method 400 shown in FIG. 4 may be performed by remote control 200, display device 112, and media device 114 for allowing contactless payments of content from content server 120. The following discussion of method 400 will refer to devices of FIGS. 1 and 2 as an exemplary non-limiting embodiment of method 400.

It is to be appreciated that not all steps may be needed to perform the disclosure provided herein. Further, some of the steps may be performed simultaneously or in a different order than shown in FIG. 4, as will be understood by a person of ordinary skill in the art.

In 402, media device 114 may provide selectable content for display on display device 112 and viewable by a user of media device 114. As noted above, the selectable content may include advertisements that allow the purchase of products that can be streamed via a network to media device 114 or that are to be delivered to a physical location such as the home of the user.

In 404, remote control 200 may receive an input that indicates selection of a particular content being provided by media device 114. In an embodiment, the input is a signal that results from manipulation of a physical button that indicates the selection of the content currently being displayed or highlighted by media device 114. For example, the physical button may be an "OK" button that indicates selection of content on which an on-screen cursor is currently highlighting on display device 112. Remote control 200 may then transmit the input as a signal or command through communication interface 202 to media device 114.

In 406, media device 114 may receive the input from remote control 200 that indicates selection of content. Media device 114 may determine whether the selected content requires payment (i.e., purchased).

In 408, media device 114 may determine that the content does not require payment and proceeds to provide access to the selected content. In an embodiment, providing access to the selected content may include retrieving the content and providing it to display device 112 for display. For example, media device 114 may retrieve content from content server 120 and may download or stream the selected content.

In 410, media device 114 may determine that the content does require payment and proceeds to determine whether stored payment information should be used to purchase the selected content. In an embodiment, the stored payment information is retrieved from content server 120 from an account associated with the user of media device 114. Content server 120 may provide media device 114 with information necessary to determine that stored payment information is available for use. In an embodiment, media device 114 determines that the stored payment information should be used based on receiving a command or signal from remote control 200. For example, media device 114 may display a prompt on display device 112 requesting a command from remote control 200 whether to proceed with using the stored payment information. In an embodiment, media device 114 may display a second prompt on display device 112 for selecting an alternative payment method through lightweight mPOS terminal 210.

In 412, media device 114 may determine that the stored payment information should be used, and purchases the selected content using the stored payment information.

In 414, media device 114 determines that stored payment information should not be used and proceeds with activating lightweight mPOS terminal 210 in remote control 200. Activation of lightweight mPOS terminal 210 results in turning remote control 200 into a lightweight mPOS for receiving contactless payment information. In an embodiment, media device 114 transmits a signal to remote control 200 that results in processor 204 activating mPOS controller 212. Activation of mPOS controller 212 also results in activating contactless interface 214. In an embodiment, the default state of mPOS controller 212 and contactless interface 214 is deactivated to conserver battery usage by remote control 200.

In 416, media device 114 may prompt for payment information via activated lightweight mPOS terminal 210. In an embodiment, the prompt may be via a message on display device 112.

In 418, media device 114 may establish a payment session with remote control 200. In an embodiment, the payment session is implemented as a secure channel via an existing connection, such as a Wi-Fi channel, between media device 114 and remote control 200.

In 420, remote control 200 may receive payment information via contactless interface 214. In an embodiment, remote control 200 communicates with an external device equipped with contactless payment capability (e.g., NFC) and receives payment information from the external device. In an embodiment, the payment information is encrypted prior to receipt by remote control 200.

In 422, remote control 200 may transmit the payment information via communication interface 202 using the established payment session with media device 114. In an embodiment, remote control 200 merely transfers the encrypted payment information using the established payment session. In other words, because remote control 200 is implemented as a lightweight mPOS, remote control 200 may have reduced capabilities with regard to how it may process encrypted payment information. Remote control 200 may merely act as a conduit for transferring, without any additional processing of the contents, the encrypted payment information to media device 114 for authorization of the purchase.

In 424, media device 114 may receive encrypted payment information from remote control 200 through established payment session. Media device 114 may then determine whether the received encrypted payment information is authorized to purchase the selected content. In an embodiment, media device 114 transfers the received encrypted payment information to another server, such as content server 120 or an authorization server, which performs the verification of the encrypted payment information. In this embodiment, media device 114 does not decrypt the encrypted payment information but merely transfers the encrypted payment information. Media device 114 then may receive a message either authorizing or denying the purchase based on the encrypted payment information. Based on the received message, media device 114 may then determine whether the purchase is authorized based on the encrypted payment information.

In 426, if media device 114 determines that the purchase of the selected content is not authorized based on the encrypted payment information, media device 114 denies purchase of the content and prevents access.

In 428, if media device 114 determines that the purchase of the selected content is authorized based on the encrypted payment information, media device 114 allows the purchase of the content and provides access. In an embodiment when the content is a product that is streamed or otherwise downloaded via media device 114, providing access to the content includes media device 114 retrieving the selected content from content server 120. In an embodiment when the content is a product that is delivered to a physical location, media device 114 may transmit a purchase order to a remote device associated with the selected content, such as content server 120. The order is configured to cause the purchase to be processed and to initiate delivery of the content to the physical location.

In 430, after completion of the purchase process, media device 114 may transmit signal to deactivate lightweight mPOS terminal 210. In an embodiment, the signal may be transmitted to remote control 200 via communication interface 202. In an embodiment, the transmission of the deactivation signal also results in closing the payment session with remote control 200.

In 432, remote control 200, responsive to receiving the signal from media device 114, processor 204 may deactivate mPOS controller 212 which also results in deactivating contactless interface 214. In an embodiment, deactivating the lightweight mPOS terminal 210 includes closing the payment session with media device 114.

Example Computer System

Figure 5:
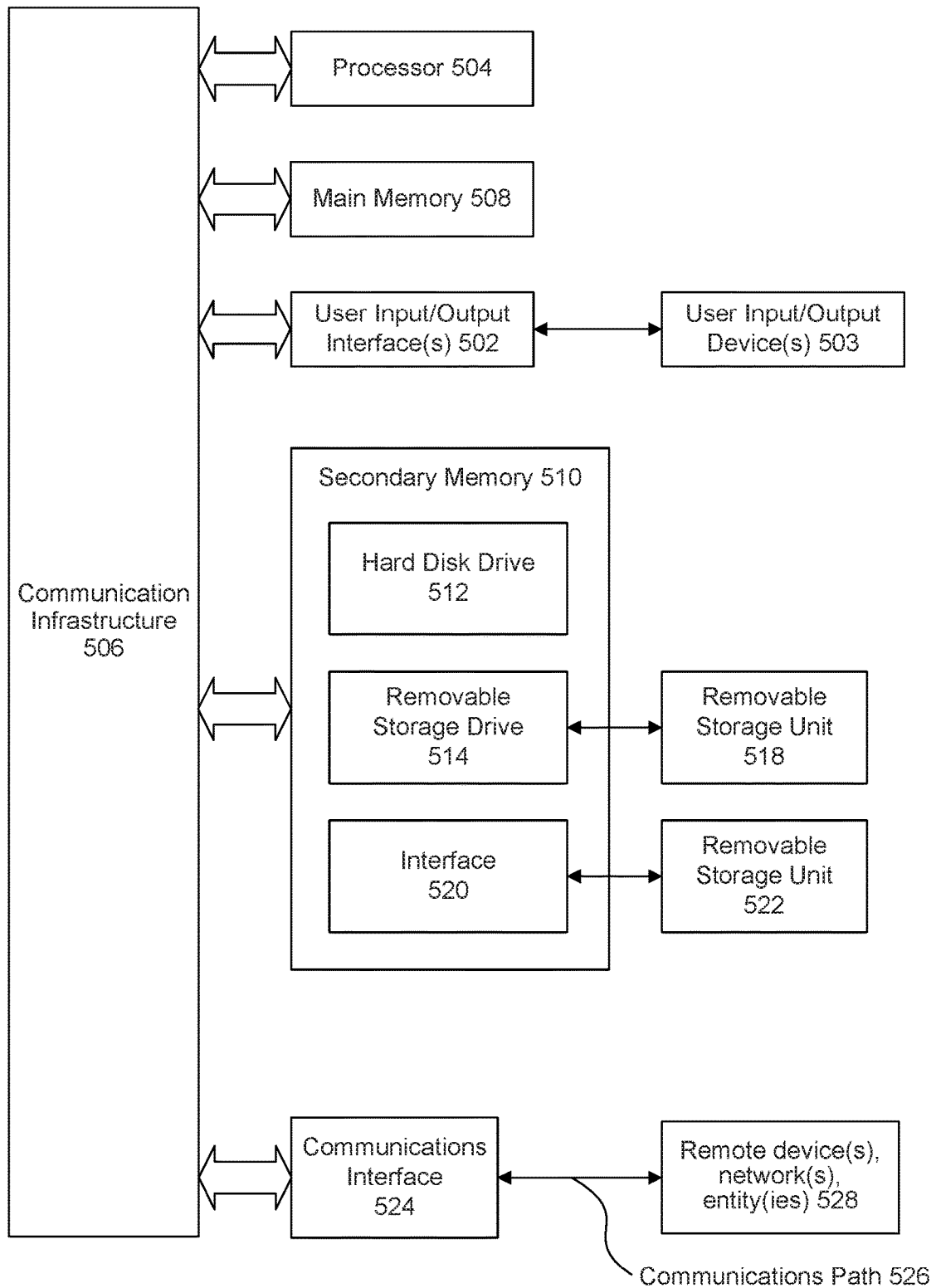
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 can be used to implement any embodiments of FIGS. 1-4, and/or any combination or sub-combination thereof.

Computer system 500 includes one or more processors (also called central processing units, or CPUs), such as a processor 504. Processor 504 is connected to a communication infrastructure or bus 506.

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for implementing a lightweight mobile point-of-sale (mPOS) system in a remote control, comprising:
   receiving, by a media system from the remote control, a selection of content provided at the media system;
   determining, by the media system and responsive to receiving the selection of content, not to use payment information stored on the media system;
   initiating, by the media system at the remote control, activation of the lightweight mPOS system including a contactless payment reader; and
   receiving, by the media device from the contactless payment reader in the lightweight mPOS system, encrypted payment information.

2. The method of claim 1, further comprising:
   establishing a payment session between the lightweight mPOS system and the media system, wherein the encrypted payment information is transmitted through the payment session.

3. The method of claim 2, further comprising:
   responsive to deactivating the lightweight mPOS system, closing the payment session.

4. The method of claim 1, wherein the selected selection of content comprises a command transmitted from the remote control.

5. The method of claim 1, further comprising:
   responsive to transmitting the encrypted payment information, receiving, from the media system, a second signal to deactivate the lightweight mPOS system including the contactless payment reader; and
   deactivating, based on the second signal, the lightweight mPOS system.

6. The method of claim 1, the determining further comprising:
    displaying, by the media system, a first prompt for enabling purchase of the selection of content using the stored information;
    displaying, by the media system, a second prompt for enabling the purchase of the selection of content using contactless payment through the remote control; and
    receiving, by the media system, a command indicating the second prompt.

7. The method of claim 1, wherein the contactless payment reader is a near-field communication (NFC) reader.

8. The method of claim 1, further comprising:
    streaming, by the media system and based on the encrypted payment information, the selection of content.

9. A remote control device, comprising:
    a lightweight mobile point-of-sale (mPOS) terminal including a contactless payment reader, wherein the lightweight mPOS terminal is configured to:
        receive, through the contactless payment reader, encrypted payment information; and at least one processor configured to:
        transmit, to a media system, a command for purchasing content through the media system;
        responsive to transmitting the command, receive, from the media system, a signal to activate the lightweight mPOS terminal including the contactless payment reader;
        responsive to receiving the signal, activate the lightweight mPOS terminal; and
        responsive to activating the lightweight mPOS terminal, transmit, to the media system, the encrypted payment information.

10. The remote control device of claim 9, wherein the at least one processor is further configured to:
    establish a payment session between the remote control device and the media system.

11. The remote control device of claim 10, wherein the at least one processor is further configured to:
    responsive to deactivating the lightweight mPOS terminal, close the payment session.

12. The remote control device of claim 9, further comprising:
    a physical button configured to cause the remote control to transmit the command.

13. The remote control device of claim 9, wherein the at least one processor is further configured to:
    responsive to transmitting the encrypted payment information, receive, from the media system, a second signal to deactivate the lightweight mPOS terminal including the contactless payment reader; and
    deactivate, based on the second signal, the lightweight mPOS terminal.

14. The remote control device of claim 9, wherein the content is an advertisement, and the at least one processor is further configured to:
    authorize the encrypted payment information; and
    responsive to authorizing the encrypted payment information, transmit a request for a product or service associated with the advertisement.

15. The remote control device of claim 9, wherein the contactless payment reader is a near-field communication (NFC) reader.

16. A media device, comprising:
    at least one processor configured to:
        receive, from a remote control device, a selection of content;
        determine not to use payment information stored on the media device for purchase of the selection of content;
        establish a payment session between the media device and the remote control device;
        transmit, through the payment session, a signal configured to activate a lightweight mobile point-of-sale (mPOS) system in the remote control device;
        receive, from the lightweight mPOS system, encrypted payment information; and
        based on the encrypted payment information, authorize the purchase of the selection of content.

17. The media device of claim 16, wherein to determine not to use the payment information stored on the media device, the at least one processor is further configured to:
    display a first prompt for enabling the purchase of the selection of content using the stored information;
    display a second prompt for enabling the purchase of the selection of content using contactless payment through the remote control device; and
    receive, from the remote control device, a command selecting one of the first prompt or the second prompt.

18. The media device of claim 16, wherein the at least one processor is further configured to:
    establish a payment session between the lightweight mPOS system and the media device, wherein the encrypted payment information is received through the payment session.

19. The media device of claim 18, wherein the at least one processor is further configured to:
    responsive to deactivating the lightweight mPOS system, close the payment session.

20. The media device of claim 16, wherein the at least one processor is further configured to:
    responsive to transmitting the encrypted payment information, receive, from the media device, a second signal to deactivate the lightweight mPOS system; and
    deactivate, based on the second signal, the lightweight mPOS system.

* * * * *